United States Patent [19]
McFadden

[11] 3,882,825
[45] May 13, 1975

[54] METHOD AND APPARATUS TO METER FORAGE

[76] Inventor: Vergil McFadden, Rt. 3, Paris, Tex. 75460

[22] Filed: June 6, 1973

[21] Appl. No.: 367,652

[52] U.S. Cl. .................................... 119/20; 256/21
[51] Int. Cl. ................................................ A01k 3/00
[58] Field of Search ................... 119/20, 51, 16, 63; 256/10, 21

[56] References Cited
UNITED STATES PATENTS

| | | | |
|---|---|---|---|
| 2,690,898 | 10/1954 | Melcher | 256/10 X |
| 2,691,359 | 10/1954 | Anstiss et al. | 119/20 |
| 3,302,616 | 2/1967 | Bradshaw | 119/20 X |

Primary Examiner—Hugh R. Chamblee
Attorney, Agent, or Firm—Howard E. Moore; Gerald C. Crutsinger

[57] ABSTRACT

A method and apparatus to define a forage feeding area in a field whereby animals are restrained from walking on forage in the feeding area. Inclined posts are adjustably secured to sleds and electrically charged wire is stretched between the posts forming a feeding area defined on one side by a plane extending downwardly from the uppermost strand of wire. The sleds are moveable across a field of forage to control feeding areas accessible to animals.

6 Claims, 3 Drawing Figures

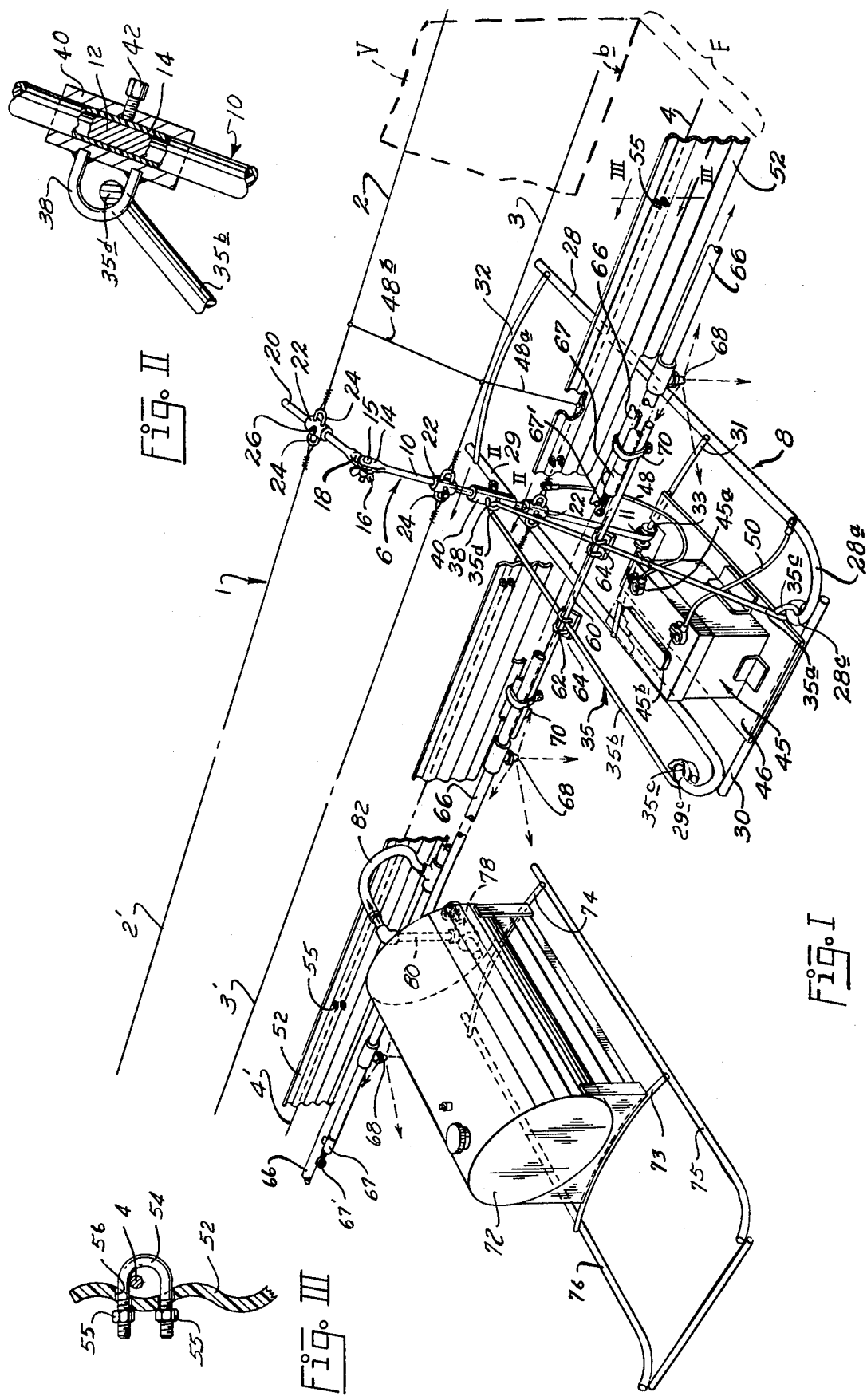

METHOD AND APPARATUS TO METER FORAGE

BACKGROUND OF THE INVENTION

The cost of producing meat has increased progressively at a rapid rate for several years. Various systems have been devised heretofore for increasing the quantity of meat which can be produced from food available on an acre of land.

One such system emphasizing a year around forage feeding program in a southern state is described in "Progressive Farmer Magazine" (Feb. 1973) at page 28. The available pasture land is divided into several fields some of which are planted in ryegrass and clover for grazing during the months of October through May, and others are planted with bermudagrass, clover and dallisgrass for grazing from April to November.

"The Farmer-Stockman" (Jan. 1973) at page 40 discusses a "high-intensity, low-frequency" grazing system wherein a pasture is divided into nine fields. Animals are concentrated in one of the fields until forage has been closely grazed. The animals are then sequentially concentrated in each of the other fields permitting growth of new forage in fields which have been grazed.

The article notes that institution of such a system is quite costly in that extensive cross-fencing is required to break the pasture into several small fields each of which must be provided with clean drinking water.

Experience has revealed that the major disadvantage of such systems resides in the fact that cattle destroy a large percentage of forage walking in a field. The grass is trampled and contaminated with urine, manure and mud.

If fresh grass is available a steer will usually be roundedout, having eaten his fill, within 2 hours. The remainder of the day is generally spent destroying and contaminating forage thereby increasing the cost of feed which must be available.

Heretofore grass has been mowed and baled to provide hay which was used to feed cattle when sufficient grass was not available in fields to provide forage for feeding the cattle. Baling and feeding hay is an expensive process. However, a much greater percentage of available feed was eaten by the animals than was consumed in conventional grazing.

SUMMARY OF INVENTION

I have devised an improved method and apparatus for metering forage which is made available to animals for feeding.

Fence posts are mounted on a movable base in an inclined position such that when an electric fence is mounted on the inclined posts, cattle walking parallel to the fence will not walk on forage in a feeding area below the fence bounded on one side by vertical plane extending downwardly from the upper wire of the fence to the ground.

As the cattle eat all of the available forage in the defined feeding area, the fence is moved forward for example, 16 inches, making a new feeding area having fresh forage therein accessible to the animals.

The posts are adjustably mounted on the base so that the angle of the posts can be changed to accommodate animals of various sizes. Strands of wire, one or all of which may be electrically charged, are adjustable longitudinally of the posts and the upper end of each post has a leg pivotally secured thereto on which the upper strand of the wire is mounted to control the width of the feeding area and the accessibility thereto by animals.

A spray system is mounted on the base and extends parallel to the fence to permit dispensing of nutrients and drugs onto the forage to supplement the diet of the animals.

A primary object of the invention is to provide an improved method of feeding animals and particularly cattle wherein forage is metered to the animals such that the animals cannot trample and contaminate the forage.

Another object of the invention is to provide a fence having posts which are inclined for supporting electrically charged strands of wire making forage available to cattle while preventing trampling and contamination of the forage.

Another object of the invention is to provide a fence which is movable across a field making forage in various sections of the field available for grazing, particularly suited for use in a high intensity, low-frequency range grazing system to eliminate extensive cost of cross-fencing.

Other and further objects of the invention will become apparent upon referring to the detailed description hereinafter following and to the drawings annexed hereto.

DESCRIPTION OF DRAWING

Drawings of a preferred embodiment of my invention are annexed hereto so that the invention may be better and more fully understood, in which:

FIG. I is a fragmentary perspective view of the forage metering apparatus;

FIG. II is a cross-sectional view through connector means for adjusting the angular relation between the post and base, taken along the lines II—II of FIG. I; and FIG. III is a cross-sectional view taken along line III—III of FIG. I.

Numeral references are employed to designate like parts throughout the various figures of the drawing.

DESCRIPTION OF A PREFERRED EMBODIMENT

Referring to FIG. I of the drawings, the numeral 1 generally designates a fence comprising strands of wire 2, 3 and 4 secured to a post 6 having a lower end adjustably secured to a base 8.

It should be appreciated that a plurality of posts 6 secured to bases 8 are positioned across the field spaced for example 35 feet apart and that wires 2, 3 and 4 are secured to each of the posts 6 to form the fence 1. However, only one post and base assembly is illustrated in the drawing.

The post 6 comprises an upwardly extending member 10 having a rigid core 12 and an insulated cover 14 of rubber, plastic, or other material which is not a conductor of electricity. The lower end of member 10 is pivotally secured to the base 8 as will be hereinafter more fully explained.

A lug 14, having an aperture extending therethrough, is secured to the upper end of member 10 for receiving a bolt 15 which extends through an aperture in lug 18 on leg 20. A wing nut 16 is threadedly secured to the end of the bolt 15 forming a hinge joint to permit adjustment of the angular relationship between upwardly extending member 10 and leg 20.

Leg 20 preferably comprises a rigid core having an electrical insulator coating on the outer surface thereof.

Collars 22 are slidably disposed on upwardly extending member 10 and leg 20 and have connector loops 24 extending outwardly from opposite sides thereof to facilitate attachment of strands 2 and 2' of wire. Strands of wire may be tied to the loops 24 as illustrated, or hook with spring catches may be secured to ends of each strand.

Each of the collars 22 has an aperture formed therein through which a set screw 26 extends to frictionally engage member 10 or leg 20.

It should be readily apparent that the elevation of each of the strands of wire 2, 3, and 4 can be independently adjusted by loosening set screw 26 and moving collar 22 longitudinally of member 10 or leg 20. It should further be apparent that wing nut 16 can be loosened to permit rotation of leg 20 about bolt 15 to further adjust the position of the upper strand of wire 2.

The base 8 preferably comprises a sled-like structure for supporting post 6 to permit movement of the post without damaging grass over which base 8 is moved.

In the particular embodiment of the invention illustrated in the drawing, base 8 comprises spaced skids or runners 28 and 29 to which opposite ends of transversely extending members 30, 31, and 32 are welded or otherwise secured.

The ends 28a and 29a of runners 28 and 29 are deflected upwardly to facilitate moving runners 28 and 29 over relatively rough terrain. Transversely extending member 30 is welded or otherwise secured to the upwardly deflected ends 28a and 29a of the skids such that it is ordinarily elevated above the ground to avoid contact with most empediments such as rocks, small mounds of dirt and the like.

Transversely extending members 31 and 32 are deflected such that central portions thereof are elevated above the ground while the ends thereof extend downwardly to skids 28 and 29 which rest upon the ground.

As the sled 8 is pulled across a field in which forage is growing, plants will be engaged by transversely extending members 30, 31, and 32 above ground level such that the plants will be deflected until the transversely extending members pass the upper ends of the plants permitting the plants to spring back to a vertical position where it is most easily eaten by animals.

A brace 35 has opposite ends pivotally connected to the base 8 and to post 6 to provide a strong rigid structure particularly adapted for adjustment of the angular relationship between the post 6 and the base 8.

In the particular embodiment the invention illustrated in the drawing, brace 35 comprises a single unitary member deflected to form legs 35a and 35b. Each of the legs 35a and 35b has a loop 35c formed in the lower end thereof engageable with loops 28c and 29c on the ends of skids 28 and 29.

A central portion 35d of brace 35 extends through a loop 38 secured to a sleeve 40 slideably disposed on upwardly extending member 10. sleeve 40 has an aperture formed therein in which a set screw 42 is threadedly secured to frictionally engage the outer surface of upwardly extending member 10.

The lower end of upwardly extending member 10 has a loop 11 formed therein which extends about a central portion of transversely extending member 31. Stop elements 33 are secured to transversely extending member 31 adjacent opposite sides of the loop 11 formed in the lower end of upwardly extending member 10 permitting rotational movement of post 6 about transversely extending member 31 while limiting movement of loop 11 longitudinally of transversely extending member 31.

From the foregoing it should be readily apparent that set screw 42 can be loosened permitting movement of sleeve 40 longitudinally of the upwardly extending portion 10 of post 6. As sleeve 40 moves along the upwardly extending portion 10 of post 6 the angular relationship between the post and the base 8 can be adjusted.

Strand 2 of wire preferably is not positioned vertically above the lower strand 4 such that animals walking parallel to the strand 2 and adjacent thereto will not walk upon a feeding area F on the ground diagrammatically illustrated in dashed outline which is bounded on one side by the intersection $b$ of a downwardly extending plane V in which the upper wire 2 is disposed.

A conventional battery operated fence charger 45 is supported by a platform 46 resting upon transversely extending members 30 and 31. Such fence chargers are commercially available and further description thereof is not deemed necessary. Charger 45 has terminals 45a and 45b of opposite electrical polarity. Terminal 45a is connected through a conductor 48 to one or more of strands of wire 2, 3, and 4.

The lower strands 3 and 4 of wire may be barbed wire in which case conductor 48 might be connected only to the upper strands 2 of wire. However, in the particular embodiment illustrated in the drawing, conductor 48 is connected to the lower strand 4 of wire and strands 2, 3, and 4 are connected by conductors 48a and 48b such that each of the strands is electrically charged.

Terminal 45b is connected through a conductor 50 to ground. In the particular embodiment illustrated the skid or runner 28 of sled 8 is constructed of conductive material and conductor 50 is secured thereto.

When an animal engages a strand of wire 2, 3, or 4 a circuit is completed through the animal from the wire to the ground causing the animal to move away from the wire.

Under typical operating conditions only one fence charger 45 would be employed to electrically charge strands 2, 3, and 4 of wire extending between a plurality of posts 6. In such instance, platform 46 and fence charger 45 would be mounted on the base 8 of one of the post assemblies.

When most of the grass in the feeding area F has been eaten cattle tend to reach through, over and under a fence to reach forage on the other side of the fence. Animals reaching under the bottom wire 4 tend to pull forage out of the ground damaging the sod and root system of the plants. A drag strip 52 constructed of a suitable non-conductive light weight rigid, material is suspended from the lower strand 4 of wire to obstruct the vision of animals reducing the tendency to reach under the lower strand 4.

In the particular embodiment of the invention illustrated in the drawing drag strip 52 is constructed of a corrugated plastic material preferably reinforced with glass fibers. Such material is commercially available.

Drag strip 52 is secured by suitable connectors such a U-bolts 54 extending through apertures 56 formed in the corrugated sheet 52 and secured by nuts 55.

Since post 6 is inclined from a vertical position and since drag strip 52, suspended from strand 4 of wire, will hang substantially vertically downwardly, the ends of drag strip 52 preferably terminate adjacent posts 6.

A rigid support bar 60 is secured by U-bolts 62 secured through openings and a strap 64 to the legs 35a and 35b of brace 35 and has suitable liquid nutrient dispensing apparatus mounted thereon.

A conduit 66 is connected through valves 67 to conduits 69 having dispensing spray heads 68 mounted therein and is secured by clamps 70 to the support bar 60 for spraying liquid onto forage adjacent drag strip 52. Valves 67 are actuated by a lever 67' to control flow therethrough.

A pressurized container 72, supported by transversely extending member 73 and 74 having opposite ends welded or otherwise secured to skids 75 and 76, has a dispensing valve 78 mounted therein. The pipe 80 is connected to valve 78 and to an end of a hose 82, the other end of which is connected to pipe 66.

If liquid feed supplement or drugs are to be dispensed onto forage for feeding animals, valve 78 is opened causing the liquid to spray from heads 68 in a general pattern indicated by dashed arrows, the area covered by one of the spray heads slightly overlapping the covered area by an adjacent spray head.

When the fence 1 is initially positioned in a field, an alleyway fifteen to twenty feet wide is formed across an end of the field, the alleyway being bounded on one side by a boundary fence and on the other side by fence 1.

After forage has been consumed in the alleyway, fence 1 is moved for example, 16 inches exposing fresh forage in the feeding area F. Spacing between strands of wire 2, 3, and 4 is dictated primarily by the size of the animals being restrained. The top strand 2 of wire is positioned such that animals walking parallel to the fence will not walk upon the feeding area F which extends parallel to the fence. Thus, forage in the feeding area F will not be trampled or contaminated by the animals.

Forage in the feeding area F is accessible to the animals since they are not restrained from standing perpendicular to the fence and eating from the feeding area F in much the same manner as eating from a feed trough.

Prior to moving the fence to expose fresh forage, liquid feed supplement, drugs and the like can be sprayed over the forage by merely opening valve 78.

The fence can be advanced by merely engaging transversely extending member 30 with a hooked towbar (not shown) and pulling member 8 forwardly a desired distance.

From the foregoing it should be readily apparent that the improved fence structure hereinbefore described accomplishes the objects of the invention. provision of posts 6, inclined from a vertical plane, forms a feeding area from which animals can eat while restraining the animals to prevent trampling and contamination of forage in the feeding area.

When the improved fence structure is employed in the manner hereinbefore described to sequentially expose additional feeding area F, the animals are controlled and are forced to eat all of the forage before additional forage is made available. Thus, forage is metered to the animals in a controlled manner such that the forage is not destroyed or passed over by the animals.

When employed in a year around forage feeding program wherein animals are moved from one field to another to consume available forage, it is not necessary to feed hay and grain to produce rapid increase in the weight of animals. Thus, the cost of producing large, well fed animals is minimized because many of the time consuming and expensive operations heretofore required are eliminated.

The improved fence structure hereinbefore described, being of a portable nature, can be moved from one field to another quite expeditiously eliminating the need for expensive crossfencing which has been required heretofore for high-density, low-frequency feeding.

It should be readily apparent that other and further embodiments of my invention may be devised without departing from the basic concept thereof.

What is claimed is:

1. A method of feeding animals comprising: positioning a fence having a plurality of strands of wire strung between inclined posts across the ground such that animals are restrained from walking in a feeding area bounded on one side by a vertical plane in which the upper most strand of wire is disposed; positioning the fence such that upper ends of the posts are inclined toward the feeding area; spraying liquid nutrient on the feeding area; moving the fence to establish a new feeding area; and delivering electricity to each of said strands of wire.

2. A fence comprising: a plurality of posts; a plurality of base elements movable over the ground; means pivotally securing the lower end of each post to a base element; a sleeve slidably disposed on each post; disengageable means restraining said sleeve against movement on said post; brace means; means to pivotally secure one end of said brace means to the base element; means pivotally securing the other end of said brace means to said sleeve, said sleeve being movable longitudinally of said post to angularly adjust said post relative to said base element; a plurality of strands of wire; means to secure each of said strands of wire to said posts; and an upper strand of wire positioned adjacent an upper end of said posts such that animals are restrained from walking in a feeding area bounded on one side by a vertical plane extending downwarly from said upper strand of wire.

3. The combination called for in claim 2 with addition of: means to dispense liquid; and means to secure said means to dispense liquid to said base such that liquid is dispensed onto the feeding area.

4. The combination called for in claim 2 with addition of: a source of electricity; and means connecting said source of electricity to each strand of said plurality of strands of wire.

5. The combination called for in claim 2 wherein the means to secure each of said strands of wire to said posts comprises: collars slidably disposed on each of said posts; a leg pivotally secured to the upper end of each of said posts; means to secure an upper strand of said plurality of strands to said leg; and means to secure lower strands of said plurality of strands of wire to said collars.

6. Apparatus to support a fence comprising: a post; spaced skids; first and second members secured between said skids; means to pivotally secure said post to said first member; a brace; means to pivotally secure an end of said brace to the skids; connector means pivotally securing another end of said brace to said post; means to limit movement of said connector means relative to said post; an anchor leg to secure an upper strand of wire to said post; means pivotally securing said anchor leg to the upper end of said post; a collar slidably secured to said post; and means to secure a lower strand of wire to said collar.

* * * * *